United States Defensive Publication [19] (H) [11] T995,001

Bass [43] Jun. 3, 1980

[54] PROCESS TO REDUCE PILLING OF POLYESTER KNIT FABRICS

[76] Inventor: Stephen Bass, 2302 Riddle Ave., Wilmington, Del. 19806

[21] Appl. No.: 69,232

[22] Filed: Aug. 23, 1979

[51] Int. Cl.[2] ..... D01C 1/00

[52] U.S. Cl. ..... 8/139

[57] ABSTRACT

The pilling propensity of knit fabric from polyester staple fiber can be reduced by scouring the fabric at a temperature in the range of about 160° to 205° F. for from about 15 to 60 minutes in a 0.3 to 1.0% aqueous caustic solution containing about 0.001 to 0.1% of a quaternary ammonium salt of the formula:

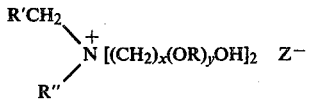

wherein R is an alkylene radical of 2 to 3 carbon atoms, R′ is H or phenyl, R″ is a $C_{12}$–$C_{18}$ hydrocarbon radical, x is 2 or 3, y is 0 to 3, and $Z^-$ is an anion, preferably the dimethyl sulfate quaternary ammonium salt of bis(hydroxy-tri-1,2-propyleneoxy-2-ethyl)tallowamine. After scouring, the fabric is normally rinsed, neutralized, rinsed again and dried.

4 Claims, No Sheets Drawing,

8 Pages Specification

The file of this unexamined application may be inspected and copies thereof may be purchased (849 O.G. 1221, Apr. 9, 1968).